United States Patent
Koskela et al.

(10) Patent No.: US 9,918,292 B2
(45) Date of Patent: Mar. 13, 2018

(54) HANDLING TRACKING AREA UPDATE REJECT WITHOUT EXTENDED DELAY

(71) Applicant: Nokia Technologies Oy, Espoo (FI)

(72) Inventors: Jarkko Koskela, Oulu (FI); Hannu Bergius, Kangasala (FI); Jorma Kaikkonen, Oulu (FI); Ari Laukkanen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 3 days.

(21) Appl. No.: 14/396,255

(22) PCT Filed: May 6, 2013

(86) PCT No.: PCT/FI2013/050492
§ 371 (c)(1),
(2) Date: Oct. 22, 2014

(87) PCT Pub. No.: WO2013/167802
PCT Pub. Date: Nov. 14, 2013

(65) Prior Publication Data
US 2015/0119032 A1    Apr. 30, 2015

Related U.S. Application Data

(60) Provisional application No. 61/644,763, filed on May 9, 2012.

(51) Int. Cl.
*H04W 4/00* (2009.01)
*H04W 60/04* (2009.01)
(Continued)

(52) U.S. Cl.
CPC ......... *H04W 60/04* (2013.01); *H04W 76/027* (2013.01); *H04W 76/068* (2013.01); *H04W 76/06* (2013.01); *H04W 88/02* (2013.01)

(58) Field of Classification Search
CPC ... H04W 60/04; H04W 76/068; H04W 76/06; H04W 88/02
(Continued)

(56) References Cited

U.S. PATENT DOCUMENTS 8,934,334 B2 * 1/2015 Kim ...................... H04W 48/02
370/216
8,938,236 B2   1/2015 Uno et al.
(Continued)

FOREIGN PATENT DOCUMENTS

EP   2184944       5/2010
EP   2695476 A1    2/2014
(Continued)

OTHER PUBLICATIONS

"3rd Generation Partnership Project; Technical Specification Group Services and System Aspects; General Packet Radio Service (GPRS) enhancements for Evolved Universal Terrestrial Radio Access Network (E-UTRAN) access (Release 10)", 3GPP TS 23.401, V10.7.0, Mar. 2012, pp. 1-278.
(Continued)

*Primary Examiner* — Tanmay Shah
(74) *Attorney, Agent, or Firm* — Mintz Levin Cohn Ferris Glovsky and Popeo, P.C.

(57) ABSTRACT

A method, apparatus and computer program product are described for reducing delay when making a network connection between user equipment (UE) and a network node when a tracking area update (TAU) request has been denied during LTE reselection. Following a revised signaling protocol, a UE can avoid activation of a NAS Attach Retry timer and move directly to establishing a connection to the network, reducing the UE communications delay from about eleven seconds to less than one second.

10 Claims, 7 Drawing Sheets

(51) Int. Cl.
*H04W 76/02* (2009.01)
*H04W 76/06* (2009.01)
*H04W 88/02* (2009.01)

(58) Field of Classification Search
USPC .................................................. 455/435.1
See application file for complete search history.

(56) References Cited

U.S. PATENT DOCUMENTS

| | | | |
|---|---|---|---|
| 2011/0170429 A1* | 7/2011 | Cao ...................... | H04L 47/122 370/252 |
| 2012/0082105 A1 | 4/2012 | Hwang et al. | |
| 2013/0012204 A1* | 1/2013 | Kim ...................... | H04W 4/005 455/435.1 |
| 2013/0040605 A1* | 2/2013 | Zhang .................. | H04W 48/06 455/411 |

FOREIGN PATENT DOCUMENTS

| | | |
|---|---|---|
| GB | 2489725 | 10/2012 |
| WO | WO-2012/137978 A1 | 10/2012 |

OTHER PUBLICATIONS

International Search Report and Written Opinion received for corresponding Patent Cooperation Treaty Application No. PCT/FI2013/050492, dated Aug. 26, 2013, 14 pages.

3GPP TS 36.331 V10.5.0 (Mar. 2012). 3rd Generation Partnership Project; Technical Specification Group Radio Access Network; Evolved Universal Terrestrial Radio Access (E-UTRA); Radio Resource Control (RRC); Protocol specification (Release 10).

3GPP TS 24.01 V10.6.1 (Mar. 2012). 3rd Generation Partnership Project; Technical Specification Group Core Network and Terminals; Non-Access-Stratus (NAS) protocol for Evolved Packet System (EPS); stage 3 (Release 10).

3GPP R2-122537 Excessive TAU delay, Nokia Corporation RAN WG2, Prague, Czech Republic, May 14, 2012.

Office action received for corresponding Vietnam Patent Application No. 1-2014-03749, dated Apr. 24, 2015, 1 page.

Nec et al., "Handling of re-attach following TAU reject or Service Request reject," 3GPP Draft; C1-111700-Disc-Reattach-TAU-Serv-Reject, 3rd Generation Partnership Project (3GPP), Mobile Competence Centre ; 650, Route Des Lucioles ; F-06921 Sophia-Antipolis Cedex ; France. vol. CT WG1, No. Tallinn; May 9, 2011, May 2, 2011.

Motorola Mobility, "GCF Priority 2—Correction to EMM test case 9.3.1.7," 3GPP Draft; 36523-1 CR1237 (REL-9)_R5-110775, 3rd Generation Partnership Project (3GPP), Mobile Competence Centre ; 650, Route Des Lucioles ; F-06921 Sophia-Antipolis Cedex ; France. vol. RAN WG5, No. Taipei, Taiwan; Mar. 9, 2011, Feb. 21, 2011, Feb. 26, 2011.

3GPP TSG RAN WG5: "LS on Automatic re-attach following TAU reject or Service Request reject," Searched (IPC) 3GPP Draft; R5-110835 LS to CT1 on Automatic Re-Attach Following TAU Reject or Service Request, 3rd Generation Partnership Project (3GPP), Mobile Competence Centre ; 650, Route Des Lucioles ; F-06921 Sophia-Antipolis Cedex ; France, vol. RAN WG5, No. Taipei, Taiwan; Feb. 21, 2011-Feb. 25, 2011, Feb. 26, 2011 (Feb. 26, 2011).

* cited by examiner

US 9,918,292 B2

1

HANDLING TRACKING AREA UPDATE REJECT WITHOUT EXTENDED DELAY

RELATED APPLICATION

This application was originally filed as PCT Application No. PCT/FI2013/05492 filed May 6, 2013, which claims priority benefit from U.S. Provisional Application No. 61/644,763, filed May 9, 2012.

FIELD

An example embodiment of the present invention relates to the field of mobile wireless communication, particularly to signaling procedures involved in handling of tracking area update (TAU) reject without extended delay.

BACKGROUND

When multi-radio user equipment (UE) moves to long term evolution (LTE) (e.g. due to reselection procedure), and does not have Packet Data Protocol (PDP) context but has made a circuit-switched (CS) location update and optionally packet switched (PS) attachment to the operator network (NW), a problematic sequence follows. UE establishes a radio resource control (RRC) connection in order to do a tracking area update (TAU). The network (NW) rejects TAU due to the missing PDP context. Then an RRC connection release message is sent to UE. The UE RRC layer will start handling it but it will delay processing the message for 60 ms in order to send a confirmation of the message reception to the NW (via radio link control acknowledgement (RLC ACK)). That is when the NW knows that it can release UE contexts in the evolved Node B (eNB) handling the NW to UE link.

Immediately upon receiving the RRC release message, UE starts an ATTACH procedure in order to obtain PDP context, but because the RRC connection is being released, ATTACH fails. The failure is reported to the non-access stratum (NAS) layer. In the NAS layer, an ATTACH retry timer (T3411, 10 seconds) is started. The fixed 10 second retry timer causes a greater than 10 second delay in getting service in evolved universal mobile telecommunications service (UMTS) terrestrial radio access network (E-UTRAN).

BRIEF SUMMARY

In one embodiment, a method comprises receiving a downlink signal from a network entity indicating that a tracking area update (TAU) was rejected, receiving a downlink signal from a network entity commanding radio resource control (RRC) release, and beginning RRC release. The method may further comprise notifying non access stratum (NAS) that RRC release is ongoing, placing NAS into hold status while RRC release is ongoing, notifying NAS that RRC release is complete, issuing an Attach request from NAS when RRC release is complete, and beginning random access signaling to establish a communications link with a network entity.

In another embodiment an apparatus comprises at least a processor, a memory containing computer code instructions, said instructions when executed by the processor cause the apparatus to: process a downlink signal from a network entity indicating that a tracking area update (TAU) was rejected, process a downlink signal from a network entity commanding radio resource control (RRC) release, and

2 beginning RRC release. The instructions, when executed by the processor, may further cause the apparatus to notify non access stratum (NAS) that RRC release is ongoing, place NAS into hold status while RRC release is ongoing, notify NAS that RRC release is complete, issue an Attach request from NAS when RRC release is complete, and begin random access signaling to establish a communications link with a network entity.

In another embodiment a computer program product comprises a non-transitory computer-readable medium with program code instructions stored therein, said instructions, with a processor, causing a mobile terminal to execute the steps: receiving a downlink signal from a network entity indicating that a tracking area update (TAU) was rejected, receiving a downlink signal from a network entity commanding radio resource control (RRC) release, and beginning RRC release. The instructions, with the processor, cause a mobile terminal to perform the steps: notifying non access stratum (NAS) that RRC release is ongoing, placing NAS into hold status while RRC release is ongoing, notifying NAS that RRC release is complete, issuing an Attach request from NAS when RRC release is complete, and beginning random access signaling to establish a communications link with a network entity.

In another embodiment an apparatus comprises means for receiving a downlink signal from a network entity indicating that a tracking area update (TAU) was rejected, means for receiving a downlink signal from a network entity commanding radio resource control (RRC) release, and means for beginning RRC release. The apparatus may further comprise means for notifying non access stratum (NAS) that RRC release is ongoing, means for placing NAS into hold status while RRC release is ongoing, means for notifying NAS that RRC release is complete, means for issuing an Attach request from NAS when RRC release is complete, and means for beginning random access signaling to establish a communications link with a network entity.

BRIEF DESCRIPTION OF THE SEVERAL VIEWS OF THE DRAWINGS

Figure 1:
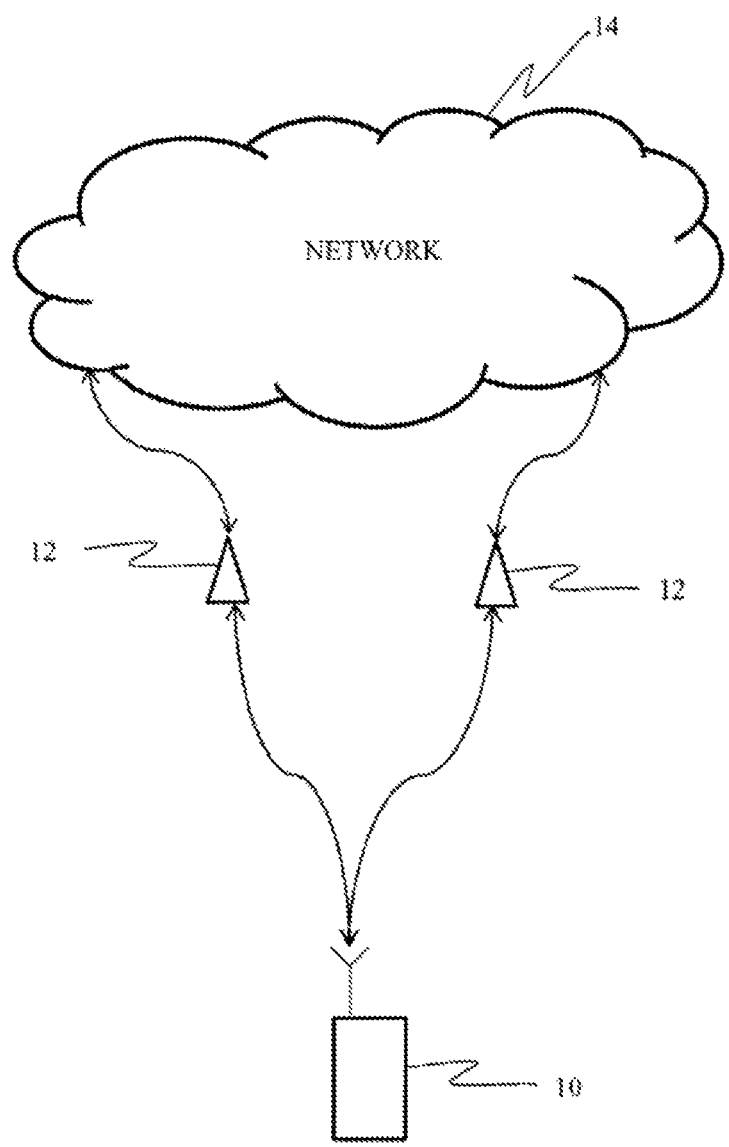
Figure 2:
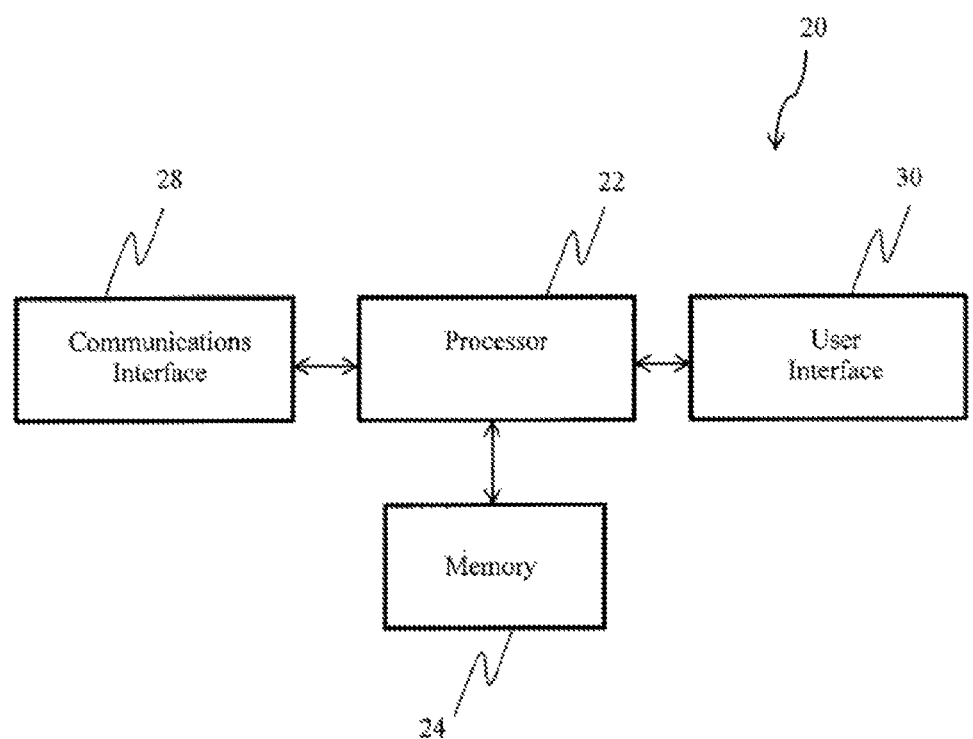
Figure 3:
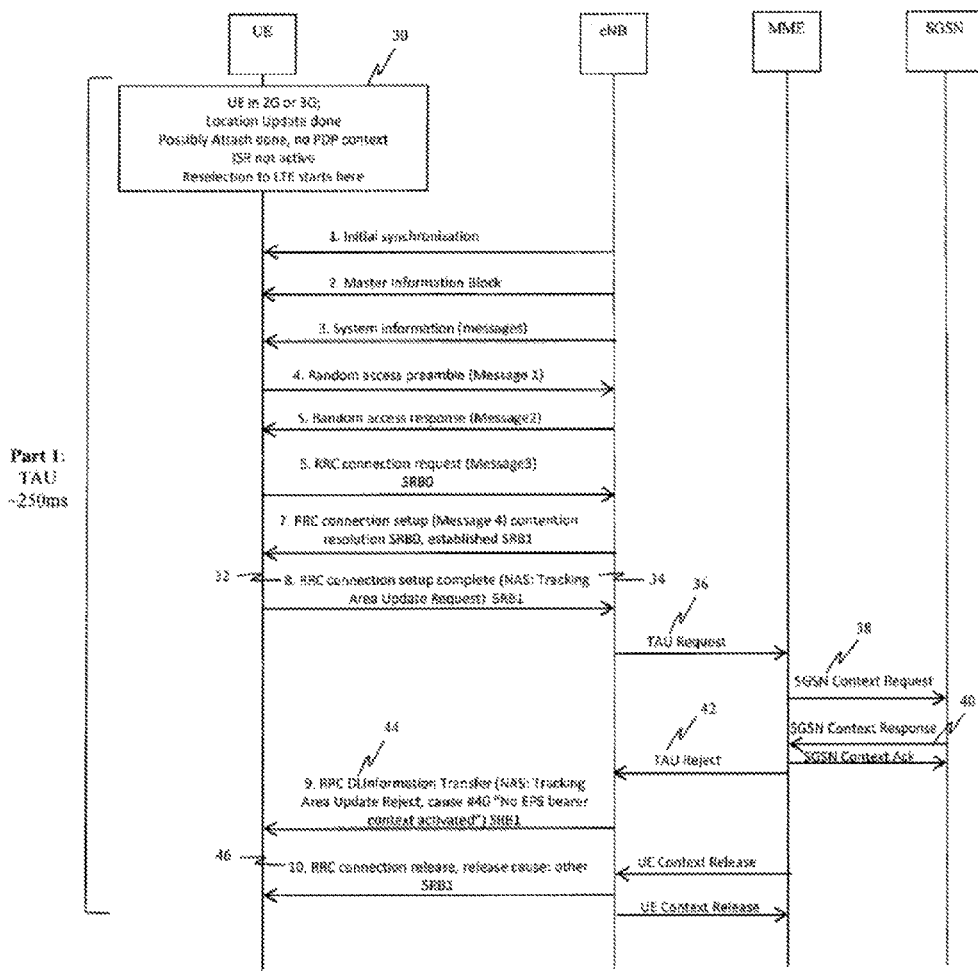
Figure 4:
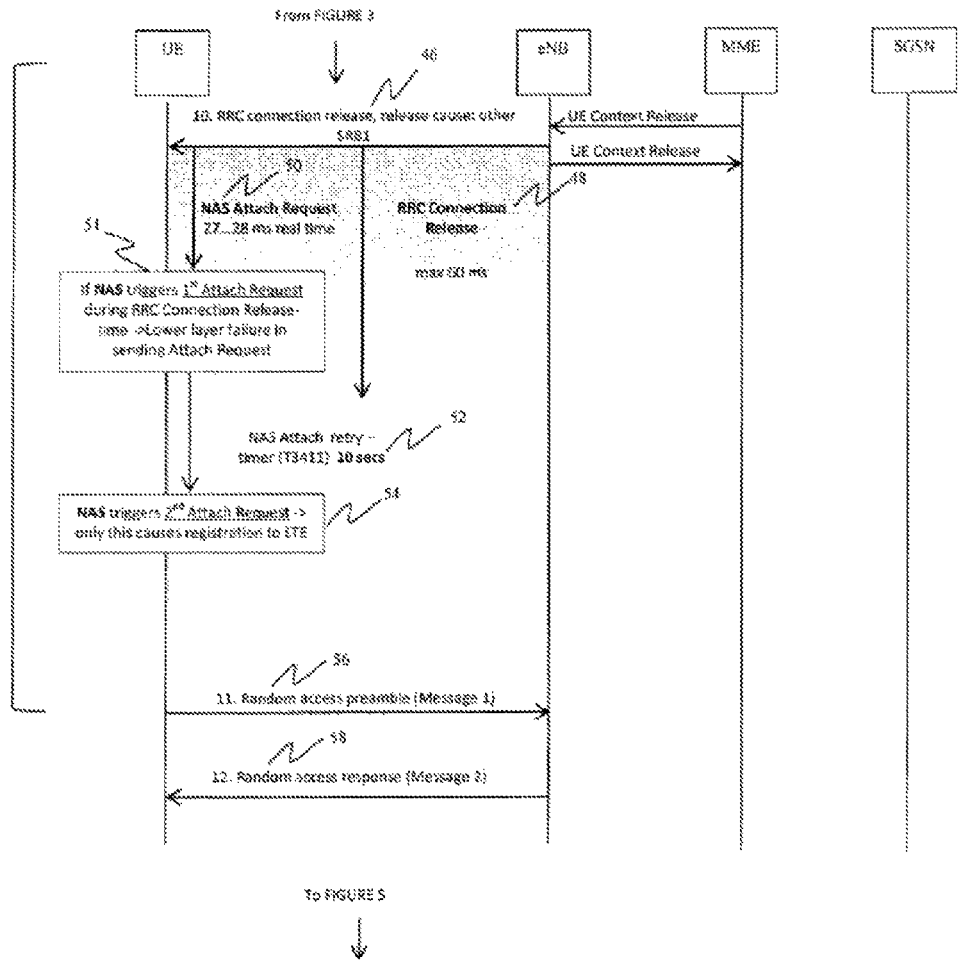
Figure 5:
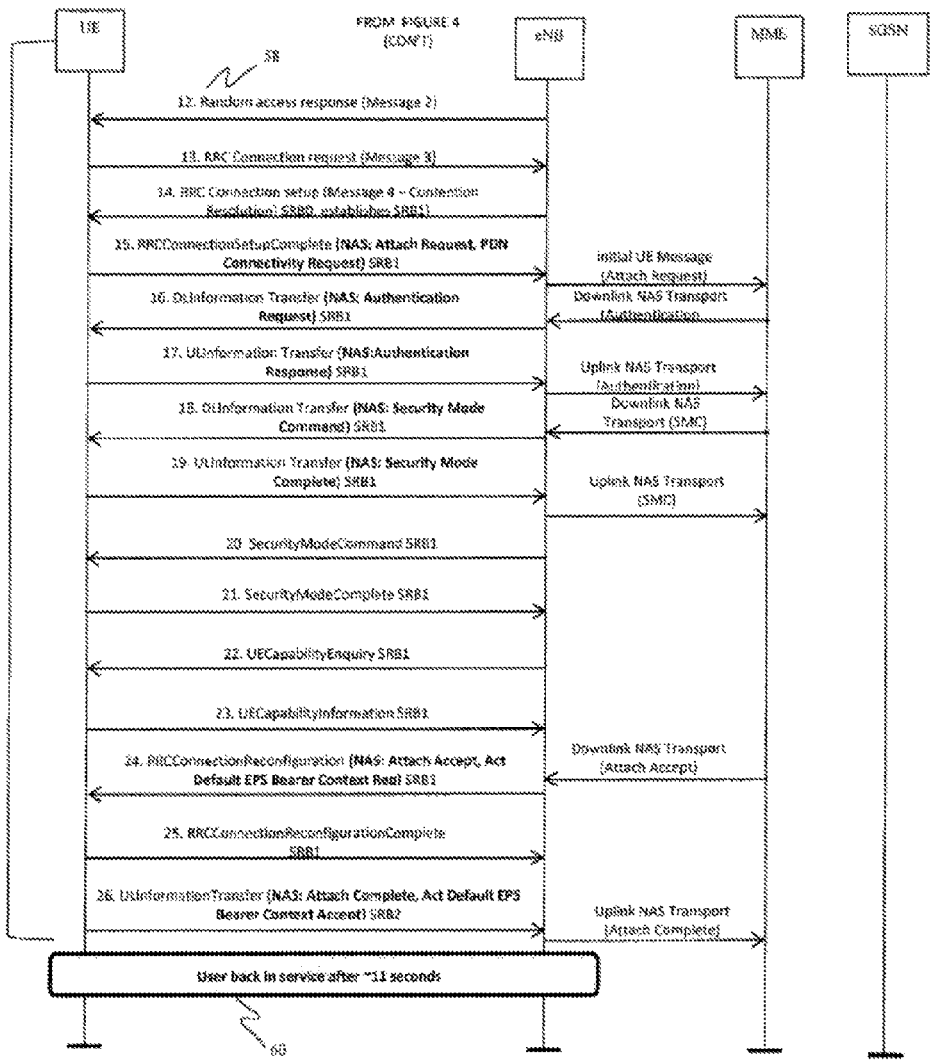
Figure 6:
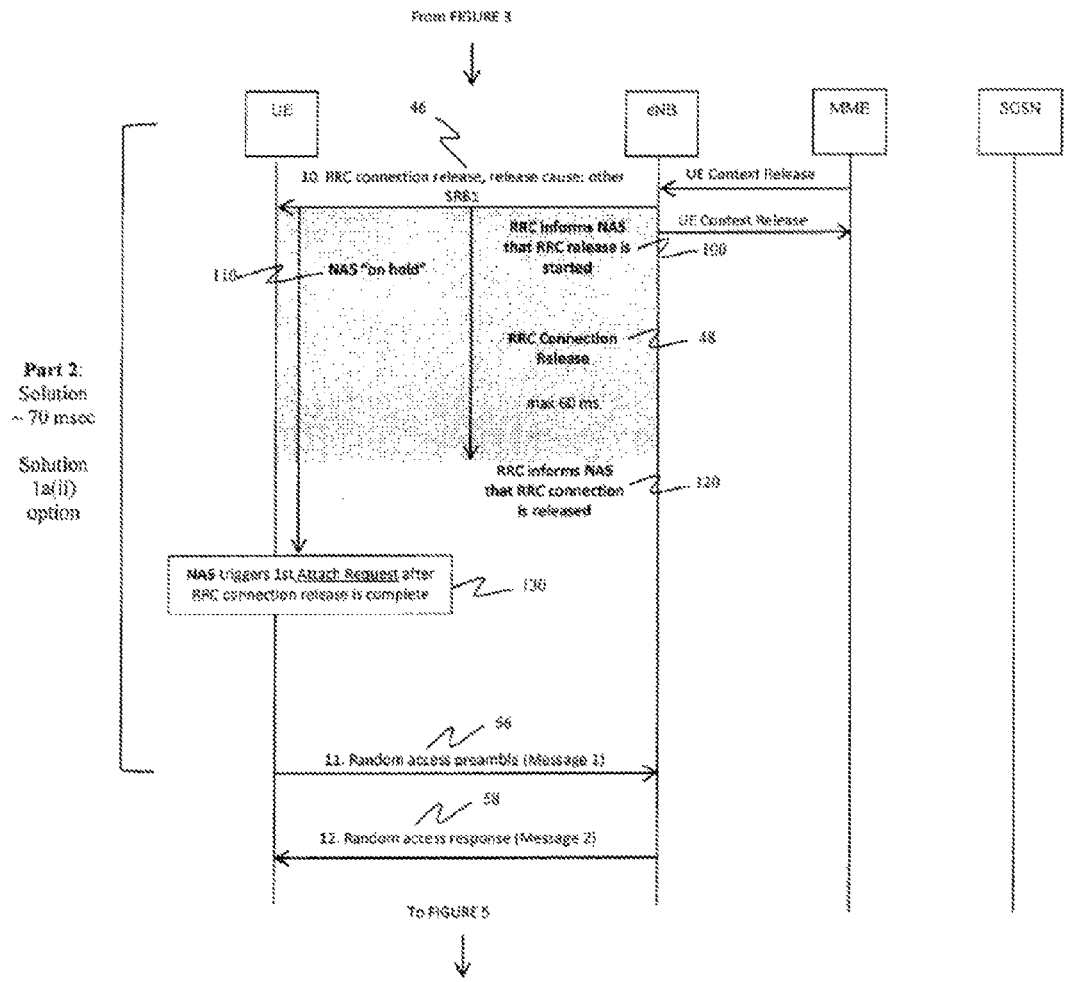
Figure 7:
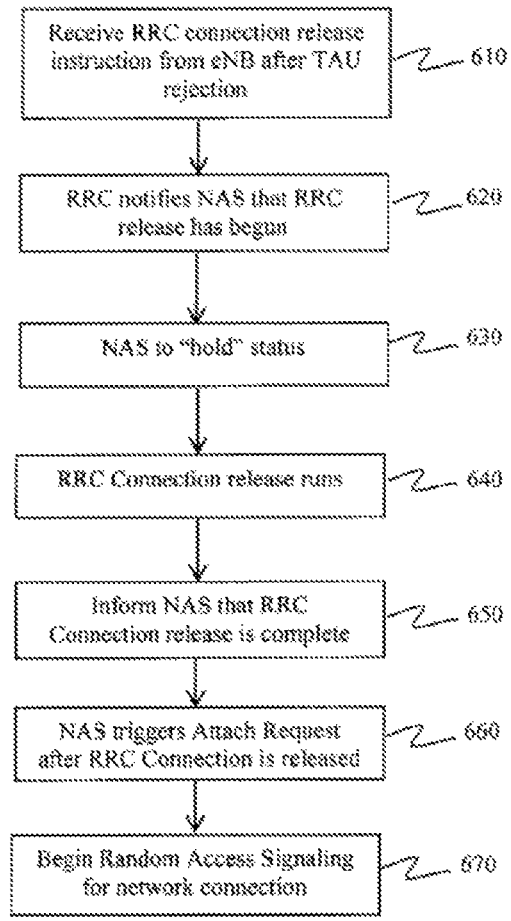

Having thus described example embodiments of the invention in general terms, reference will now be made to the accompanying drawings, which are not necessarily drawn to scale, and wherein:

FIG. 1 is a schematic drawing of a mobile wireless network connection;

FIG. 2 is a schematic drawing of a mobile terminal;

FIG. 3 is Part 1 of a signaling diagram illustrating LTE reselection;

FIG. 4 is Part 2 of a signaling diagram illustrating LTE reselection;

FIG. 5 is Part 3 of a signaling diagram illustrating LTE reselection;

FIG. 6 is a revised Part 2 of the signaling diagram of FIG. 4 according to one embodiment of the invention;

FIG. 7 is flow diagram of the method embodiment of the invention.

DETAILED DESCRIPTION

Example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein;

rather, these embodiments are provided so that this disclosure will satisfy applicable legal requirements. Like reference numerals refer to like elements throughout.

As used in this application, the term "circuitry" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s) software (including digital signal processor(s), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or application specific integrated circuit for a mobile phone or a similar integrated circuit in server, a cellular network device, or other network device.

Referring now to FIG. 1, mobile terminals 10 may communicate with a network 14 utilizing an uplink from the mobile terminal 10 to the network 14 and a downlink from the network 14 to the mobile terminal. The mobile terminals 10 may be of various types of mobile communication devices such as, for example, mobile telephones, personal digital assistants (PDAs), pagers, laptop computers, or any of numerous other hand held or portable communication devices, computation devices, content generation devices, content consumption devices, or combinations thereof, generally termed "user equipment" (UE). The mobile terminal 10 may communicate with a network via an access point 12, such as a Node B, an evolved Node B (eNB), a base station or the like, each of which comprises a radio frequency transmitter and receiver. The mobile terminal 10 may communicate with various types of networks 14 including, for example, a Long Term Evolution (LTE) network, an LTE-Advanced (LTE-A) network, a Global Systems for Mobile communications (GSM) network, a Code Division Multiple Access (CDMA) network, e.g., a Wideband CDMA (WCDMA) network, a CDMA2000 network or the like, a General Packet Radio Service (GPRS) network, a Universal Terrestrial Radio Access Network (UTRAN), a GSM Edge Radio Access Network (GERAN) or other type of network.

Referring now to FIG. 2, an apparatus 20 that may be embodied by or otherwise associated with a mobile terminal 10 may include or otherwise be in communication with a processor 22, a memory device 24, a communication interface 28, and a user interface 30.

In some example embodiments, the processor 22 (and/or co-processors or any other processing circuitry assisting or otherwise associated with the processor) may be in communication with the memory device 24 via a bus for passing information among components of the apparatus 20. The memory device 24 may include, for example, one or more non-transitory volatile and/or non-volatile memories. In other words, for example, the memory device 24 may be an electronic storage device (e.g., a computer readable storage medium) comprising gates configured to store data (e.g., bits) that may be retrievable by a machine (e.g., a computing device like the processor). The memory device 24 may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device 24 could be configured to store instructions for execution by the processor 22.

The apparatus 20 may, in some embodiments, be embodied by a mobile terminal 10. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading. In the embodiment in which the apparatus 20 is embodied as a mobile terminal 10, the processor may be embodied by the processor of the mobile terminal.

In an example embodiment, the processor 22 may be configured to execute instructions stored in the memory device 24 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a mobile terminal 10) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

Meanwhile, the communication interface 28 may be any means such as a device or circuitry embodied in either hardware or a combination of hardware and software that is configured to receive and/or transmit data from/to a network 12 and/or any other device or module in communication with the apparatus 20. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In order to support multiple active connections simultaneously, such as in conjunction with a digital super directional array (DSDA) device, the communications interface of one embodiment may include a plurality of cellular radios, such as a plurality of radio front ends and a plurality of base band chains. In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In some example embodiments, such as instances in which the apparatus 20 is embodied by a mobile terminal 10, the apparatus may include a user interface 30 that may, in turn, be in communication with the processor 22 to receive an indication of a user input and/or to cause provision of an audible, visual, mechanical or other output to the user. As such, the user interface may include, for example, a keyboard, a mouse, a joystick, a display, a touch screen(s), touch areas, soft keys, a microphone, a speaker, or other input/output mechanisms. Alternatively or additionally, the processor may comprise user interface circuitry configured to control at least some functions of one or more user interface elements such as, for example, a speaker, ringer, microphone, display, and/or the like. The processor and/or user interface circuitry comprising the processor may be configured to control one or more functions of one or more user interface elements through computer program instructions (e.g., software and/or firmware) stored on a memory accessible to the processor (e.g., memory device and/or the like).

In the apparatus embodied by a mobile terminal 10, the processor 22 is the means for executing various functions that may be specified for preparing the mobile terminal for network communications. The memory device 24 may contain program code instructions causing the processor to execute the various functions, or the processor may have memory associated with it that contains the program code instructions. Thus, the means for executing various functions in the mobile terminal may include the memory with computer code instructions stored therein. The communications interface 28 is the means for receiving signals from a network entity that are then processed to determine appropriate functions to be executed by the processor.

Referring to FIG. 3, the UE condition that leads to the difficulty that example embodiments of the present invention are directed to solving is illustrated. The initial conditions 30 are that UE is in a 2G or 3G configuration. The location update for the UE is complete. There is no Packet Data Protocol (PDP) context established yet. Idle Mode Signaling (ISR) is not active. Reselection of the UE to Long Term Evolution (LTE) begins.

FIG. 3 shows the first part (of three parts) of the signaling sequence. UE and a network node (eNB) exchange several signals in the LTI reselection sequence. The sequence also involves a network Mobility Management Entity (MME) and the Source GPRS Support Node (SGSN) (where GPRS is the General Packet Radio Service). While the illustrated sequence of signals is exchanged, the end user of a mobile device is without service waiting for the connection to be established/updated.

During the LTE reselection signaling, radio resource control (RRC) setup is completed 32 and the Non Access Stratum (NAS) layer issues a Tracking Area Update (TAU) request 34. The TAU request 36 is directed by the node to the MME.

The MME issues an SGSN context request 38 to the SGSN, which is returned to the MME 40 denied because PDP context is missing. That leads the MME to reject the TAU request 42 through the node to the UE in a downlink message 44. The node then directs that RRC be released 46. To this point, the sequence has taken about two hundred and fifty (250) milliseconds.

Referring to FIG. 4, the sequence continues with UE simultaneously taking two actions. It begins the RRC connection release procedure 48 while NAS initiates an Attach request 50 to obtain the PDP context that led to the TAU rejection. But, because RRC is being released, the Attach fails 51. An NAS Attach retry timer is automatically activated 52, which interposes a ten (10) second delay into the sequence.

After the ten second pause, the NAS triggers a second Attach request 54 attempting to register to LTE. UE transmits a random access preamble 56 in an uplink message to the node, which sends a random access response 58 in a subsequent downlink message. Referring to FIG. 5, the connection sequence continues routinely to its conclusion where the UE is in service 60, attach complete. However, the entire sequence required about eleven (11) seconds to complete while the end user waits without network service.

There are several options for avoiding the ten second delay in the LTE reselection process. First for consideration are options that are UE based.

UE-Based Solutions

The object of a UE-based solution is to avoid activation of the NAS Attach retry timer so that the ten second delay does not activate. In the illustrated sequence of FIG. 4, the retry timer activates when an NAS Attach is attempted 51 while the RRC release procedure is ongoing. So, the initial solution is to prevent activation of the NAS Attach procedure during the RRC release procedure. This can be accomplished in more than one manner, each of which will be labeled in the following description.

RRC could indicate to NAS that the RRC release is in progress (Option 1a). During the period that the RRC release is active, NAS would not initiate an Attach, but rather would wait some period of time. Either a fixed timer could run (set within UE programming) (Option 1a(i)) or RRC could indicate to NAS that the connection release is complete (Option 1a(ii)).

Alternatively, if RRC receives an Attach, or any NAS message, during the RRC connection release procedure, RRC could delay sending the message until the connection is released and then starts establishing new RRC connection (Option 1b). Or, if RRC indicates to NAS that the RRC connection is released during the ATTACH procedure (or any ongoing NAS procedure requiring RRC to convey the NAS message), NAS could immediately restart the Attach without delay or according to a specific timer (which could be specified or left to the UE implementation) (Option 1c).

UE and NW-Based Solutions

Because the absence of packet data protocol (PDP) context is the reason that the tracking area update (TAU) is denied (leading to the NAS Attach failure), a solution to that problem is for the network not to try TAU if the PDP context is missing (Option 2). When UE re-selects to E-UTRAN and does not have PDP context, UE would send. Attach instead of attempting TAU.

Alternatively, the UE could eliminate the sixty millisecond delay in handling the RRC connection release (see FIG. 3) (Option 3). That would cause a new RRC connection establishment for the NAS Attach. However, a drawback of this solution is that the network would not necessarily receive confirmation of RRC connection release reception and the network could continue trying to reach the UE. Therefore, this solution though possible may not be favored.

NW-Based Solutions

Addressing the problem from the network side only, the network function could be amended such that the network would not release the RRC connection when TAU is rejected for the missing PDP context (Option 4). This approach would require the provision of an indication of TAU failure to the eNB (Option 4a). Or, alternatively, in the request from MME to release the connection a new "cause" value could be defined to delay the release for some time (Option 4b). The time could be specified or left to NW implementation—or configurable by the MME.

Consideration of these alternative solutions requires an objective assessment of the impact of each solution on the specifications and programming of each of the affected entities (user equipment, network). Reducing that consideration to its simplest terms (big or small impacts), the result is illustrated in Table 1.

TABLE 1

Impacted entities of the different solution alternatives

| Solutions | Alternatives | UE RRC impact | UE NAS impact | NW RRC impact | NW NAS impact |
|---|---|---|---|---|---|
| UE | 1 a), alternative i | small | small | — | — |
|  | 1 a), alternative ii | small | small | — | — |
|  | 1 b) | big | — | — | — |
|  | 1 c) | small | small | — | — |
| UE + NW | 2 | big | big | big | big |
|  | 3 | small | — | big | — |
| NW | 4 a) | — | — | big | big |
|  | 4 b) | — | — | big | big |

Overall, it would appear that a UE based solution is best because its impact is confined to UE and the relative difficulty of implementing the solution is small. Narrowing the focus to Options 1a, 1b and 1c, it is determined that Option 1a(ii) would be the most effective solution with the least impact on UE.

Referring to FIG. 6 the Option 1a(ii) solution is illustrated in a signaling diagram. After the eNB receives the TAU reject signal, it notifies UE to release the RRC connection 46 as before. In the revised process, RRC would send a new indication to the NAS layer immediately when RRC Connection Release is received from eNB alerting NAS that RRC release has started 100. Receiving that information from RRC, NAS goes into a "hold" state 110 (rather than attempting Attach, as before).

The RRC Release process 48 takes about sixty (60) milliseconds. Once RRC release is complete, NAS receives that indication from RRC 120. Only then does NAS trigger a first Attach request 130. As FIG. 6 indicates, the Attach process then proceeds with random access signaling 56, 58 between UE and the eNB to establish the connection.

In the revised protocol of FIG. 6, the sequence labeled Part 2 takes about seventy (70) milliseconds rather than over ten seconds. In all, the revised signaling process of FIGS. 3, 6 and 5 together would cause the end user of UE a wait of less than one second for LTE network connectivity.

FIG. 7 illustrates a flowchart of an example method, and/or computer program product according to example embodiments of the invention. It will be understood that each block or operation of the flowcharts, and/or combinations of blocks or operations in the flowcharts, can be implemented by various means. Means for implementing the blocks or operations of the flowcharts, combinations of the blocks or operations in the flowchart, or other functionality of example embodiments of the present invention described herein may comprise hardware, and/or a computer program product comprising a computer-readable storage medium having one or more computer program code instructions, program instructions, or executable computer-readable program code instructions stored therein.

In this regard, program code instructions may be stored on a memory device, such as memory device 24 (FIG. 2), of an example apparatus, such as example apparatus 20, and executed by a processor, such as the processor 22. As will be appreciated, any such program code instructions may be loaded onto a computer or other programmable apparatus (e.g., processor 22, memory device 24) from a computer-readable storage medium to produce a particular machine, such that the particular machine becomes a means for implementing the functions specified in the flowcharts' block(s) or operation(s). These program code instructions may also be stored in a computer-readable storage medium that can direct a computer, a processor, or other programmable apparatus to function in a particular manner to thereby generate a particular machine or particular article of manufacture. The instructions stored in the computer-readable storage medium may produce an article of manufacture, where the article of manufacture becomes a means for implementing the functions specified in the flowchart block(s) or operation(s). The program code instructions may be retrieved from a computer-readable storage medium and loaded into a computer, processor, or other programmable apparatus to configure the computer, processor, or other programmable apparatus to execute operations to be performed on or by the computer, processor, or other programmable apparatus. Retrieval, loading, and execution of the program code instructions may be performed sequentially such that one instruction is retrieved, loaded, and executed at a time. In some example embodiments, retrieval, loading and/or execution may be performed in parallel such that multiple instructions are retrieved, loaded, and/or executed together. Execution of the program code instructions may produce a computer-implemented process such that the instructions executed by the computer, processor, or other programmable apparatus provide operations for implementing the functions specified in the flowchart block(s) or operation(s).

Accordingly, execution of instructions associated with the blocks or operations of the flowchart by a processor, or storage of instructions associated with the blocks or operations of the flowchart in a computer-readable storage medium, support combinations of operations for performing the specified functions. It will also be understood that one or more blocks or operations of the flowchart, and combinations of blocks or operations in the flowchart, may be implemented by special purpose hardware-based computer systems and/or processors which perform the specified functions, or combinations of special purpose hardware and program code instructions.

Expressed as a method for avoiding the activation of the NAS Attach retry 10 sec timer, the method would take the form illustrated in FIG. 7. Initially, UE receives a signal 610 from the eNB to release the RRC connection after the TAU request is rejected. In the UE, RRC notifies NAS that RRC release has begun 620. NAS enters a "hold" status 630, avoiding the execution of an Attach attempt and retry timer activation. RRC connection release runs 640 for a period of about sixty (60) milliseconds. When the RRC connection release is complete, RRC informs NAS that the release is concluded 650. NAS is then free to trigger an Attach Request 660. That request causes the UE to begin Random Access Signaling 670 to re-establish a network connection. The end user has network service in about seventy milliseconds rather than eleven seconds.

The following list of abbreviations is included for reference to clarify any abbreviations that appear in the Detailed Description, the Figures, and that may appear in the claims.
NAS=Non Access Stratum
RRC=Radio Resource Control
TAU=Tracking Area Update
NW=Network
PDP context=Packet Data Protocol context
MME=Mobility Management Entity
eNB=evolved NodeB
ISR=Idle Mode Signalling
UE=User Equipment
CS=Circuit Switched
PS=Packet Switched
LTE=Long Term Evolution
E-UTRAN=Evolved Universal Terrestrial Radio Access Network
SRB=Signaling Radio Bearer
PDCP=Packet Data Convergence Protocol
RLC=Radio Link Control
ACK=Acknowledgement
SGSN=Service GPRS Support Node
GPRS=General Packet Radio Service Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method comprising:
receiving, at a user equipment, a message received from a network node, the message indicating a radio resource control connection to be released in response to a tracking area update reject;
awaiting, at a non-access-stratum layer, a notification from a lower, radio resource control layer, the notification indicating the radio resource control connection release is completed;
executing, at the user equipment and in response to the received message, a delay timer;
allowing an attach procedure to start, when the delay timer expires; and
allowing the attach procedure to start, when the notification from the lower, radio resource control layer is received, the notification bypassing the delay timer in order to allow the attach procedure to start.

2. The method of claim 1, wherein the attach procedure is executed using an existing connection or a new connection is established using Random Access procedure.

3. The method of claim 2, wherein a cause value of Tracking Area Update procedure Reject requires initiation of the attach procedure.

4. The method of claim 1, wherein a cause value of the received message is other.

5. An apparatus comprising:
at least one processor; and
at least one memory including computer program code, the at least one memory and the computer program code configured to, with the at least one processor, cause the apparatus to at least:
receive a message, from a network node, the message indicating a radio resource control connection to be released in response to a tracking area update reject;
await, at a non-access-stratum layer, a notification from a lower, radio resource control layer, the notification indicating the radio resource control connection release is completed, the notification enabling a delay in the start of the attach procedure;
execute, in response to the received message, a delay timer;
allow an attach procedure to start, when the delay timer expires; and
allow the attach procedure to start, when the notification from the lower, radio resource control layer is received, the notification bypassing the delay timer in order to allow the attach procedure to start.

6. The apparatus of claim 5, wherein the attach procedure is executed using an existing connection or a new connection is established using Random Access procedure.

7. The apparatus of claim 6, wherein a cause value of Tracking Area Update procedure Reject requires initiation of the attach procedure.

8. The apparatus of claim 5, wherein a cause value of the received message is other.

9. The apparatus of claim 5, wherein a value, for the bypass timer, is specified by at least one of signaling from network, specification, and user equipment.

10. A computer program product comprising at least one non-transitory computer-readable storage medium having executable computer-readable program code instructions stored therein, the computer-readable program code instructions configured to at least:
receive a message, at a user equipment from a network node, the message indicating a radio resource control connection to be released in response to a tracking area update reject;
await, at a non-access-stratum-layer, a notification from a lower, radio resource control layer, the indicating the radio resource control connection release is completed;
execute, in response to the received message, a delay timer;
allow an attach procedure to start, when the delay timer expires; and
allow the attach procedure to start, when the notification from the lower, radio resource control layer is received, the notification bypassing the delay timer in order to allow the attach procedure to start.

\* \* \* \* \*